Feb. 25, 1969
H. I. HAZZARD
3,429,411
CENTRIFUGAL CLUTCH
Filed June 5, 1967
FIG.1
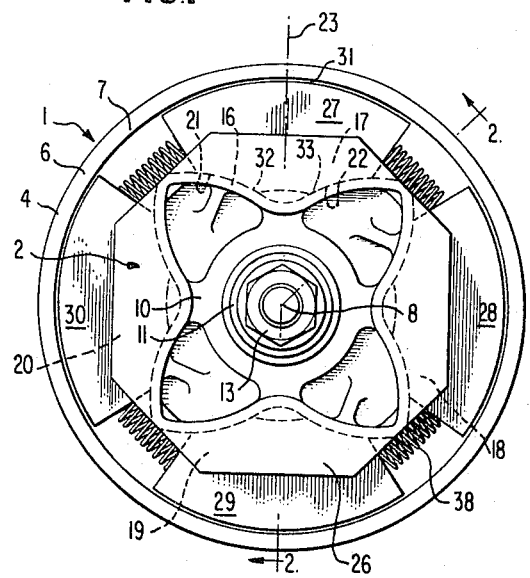
FIG.2
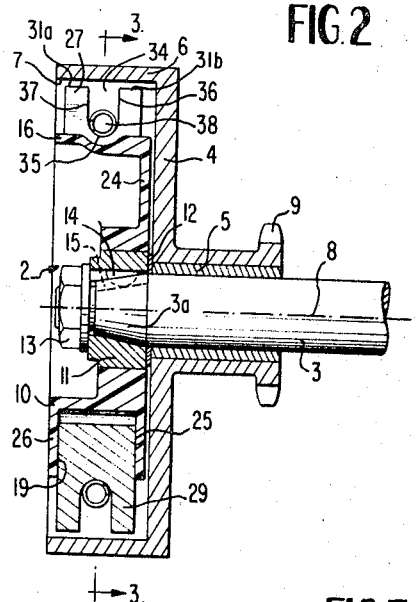
FIG.4A
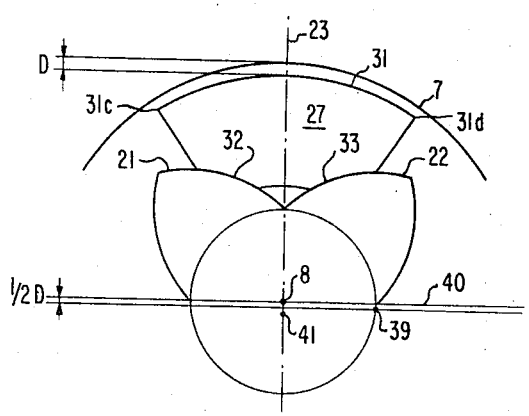
FIG.3
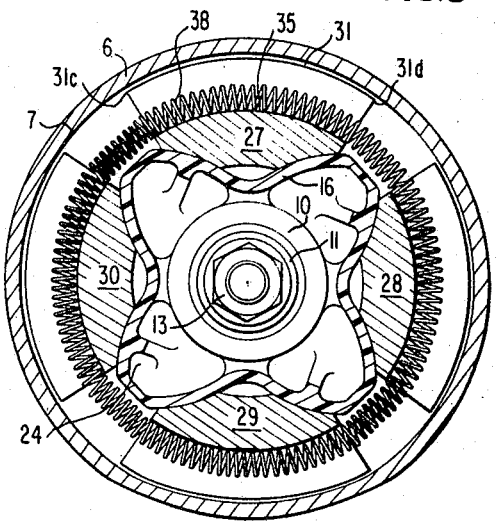
FIG.4B
INVENTOR
HARRY I. HAZZARD
BY Burns, Doane, Benedict, Swecker & Mathis
ATTORNEYS

United States Patent Office 3,429,411
Patented Feb. 25, 1969

3,429,411
CENTRIFUGAL CLUTCH
Harry I. Hazzard, Los Angeles, Calif., assignor to McCulloch Corporation, Los Angeles, Calif., a corporation of Wisconsin
Filed June 5, 1967, Ser. No. 643,671
U.S. Cl. 192—105
Int. Cl. F16d 23/10, 43/24, 11/06
4 Claims

ABSTRACT OF THE DISCLOSURE

A centrifugal clutch having a one piece, molded driving assembly. This assembly includes an undulating web, spaced from the clutch drive shaft which serves to support clutch shoes in their retractive position. The web supports the retracted clutch shoes so as to prevent clutch shoe rocking. When the clutch shoes are centrifugally actuated so as to move outwardly into clutching engagement with a clutch drum the web is disposed in surface conforming engagement with portions of the clutch shoes. The clutch shoes supporting surfaces of the web have a particular radius of curvature which allows the web to be in surface conforming engagement with portions of the shoes when they are centrifugally actuated and also when they are retracted.

---

This invention pertains to a centrifugal clutch. In particular it relates to a centrifugal clutch uniquely suited for incorporation in power tools such as chain saws and the like.

BACKGROUND OF INVENTION

A variety of centrifugal clutches have been developed in an effort to promote reliability in clutching operation and durability of components. For example in the U.S. Sproul Patent 2,852,117, a clutch is disclosed where clutch shoes are supported in V-shaped pockets having essentially straight sidewalls. In the U.S. Rice Patent 3,187,871 a centrifugal clutch is featured where a clutch shoe actuating cam includes curved cam faces. In the U.S. Magnavita Patent 3,084,775 a clutch is featured where spiral shaped clutch shoes are slidably supported in spirally configured pockets.

In each of the Rice, Sproul and Magnavita clutches, the clutch shoe supporting hub is essentially solid in character. It is particularly significant to note that, in none of these clutches, does the clutch hub provide clutch shoe stabilizing, mating engagement with clutch shoes in *both* the retracted and expanded, i.e. driving position of these shoes.

The essentially solid hub character of each of these previously developed clutches, in addition to providing undesired weight, reduces clutch responsiveness to the extent that the inertia of the driving assembly of the clutch is increased.

In failing to provide surface stabilizing support for clutch shoes in both the retracted and the extended position, these previously known clutches contribute to erratic clutch shoe movements which may tend to produce uneven or excessive clutch wear as well as clutch chattering and excessive clutch noise.

OBJECTS OF INVENTION

It is a specific object of the present invention to provide an improved clutch structure which effectively obviates or minimizes the drawbacks of previously developed clutches such as those above noted.

It is a further main object of the invention to provide an improved centrifugal clutch structure which enables clutch shoes to be stably supported in their retracted position.

It is a further major object of the invention to provide a uniquely unitized web arrangement for supporting clutch shoes on a driving assembly so as to reduce the weight and inertia of the driving assembly.

Another major object of the invention is to provide an arcuate clutch shoe actuating cam surface which has a particular radius of curvature designed to provide surface conforming engagement between the cam and a clutch shoe in all positions of the clutch shoe, from retracted to the extended position.

SUMMARY OF INVENTION

One major apparatus aspect of the invention involves a centrifugal clutch structure including a driving assembly adapted to be connected to rotary drive means. In this clutch, a driven assembly, adapted to be connected to rotary load means, includes arcuately extending first clutch face means facing inwardly toward the axis of rotation of the driven assembly. The driven assembly and driving assembly have coaxially aligned axes of rotation. The driving assembly includes centrifugally responsive clutch shoe means having generally outwardly facing and arcuately extending, second clutch face means. This second face means has a radius of curvature substantially the same as the radius of curvature of the first clutch face means. The driving assembly further includes support means adapted to support the clutch shoe means in a retracted position with a radius of curvature of the clutch of the second clutch face means aligned with a radius of curvature of the first clutch face means, and with the axis of curvature of the second clutch face means radially displaced from the axis of curvature of the first clutch face means along the aligned radii. This axial displacement is equal to the radial distance between the second clutch face means and the first clutch face means as measured along the aligned radii. The support means further includes a generally arcuately extending, cam means having an axis of curvature parallel to the axis of rotation of the driving assembly. This axis of curvature, when the clutch shoe means is retracted, is perpendicularly displaced from a plane extending along the axis of curvature of the first clutch face means and perpendicular to the aligned radii by a distance equal to substantially half of the distance between the first and second clutch face means as measured along the aligned radii. The clutch shoe means includes cam follower means adapted to matingly engage cam means when the clutch shoe means is in the retracted position and in engagement with the first clutch face means.

Another independently significant apparatus facet of the invention, in the context of a conventional centrifugal clutch including a driving assembly and a driven assembly, resides in unique support means for a clutch shoe. This support means is carried by the driving assembly and includes circumferentially spaced and mutually facing portions engageable with a clutch shoe to prevent rocking movement thereof relative to the driving assembly. At least one of the mutually facing portions includes surface means matingly engageable with a surface portion of the clutch shoe when the clutch shoe is centrifugally actuated to bring it into engagement with the driven assembly.

A still further independently significant facet of the invention resides in specific structure of clutch shoe support means carried by the driving assembly of the clutch. This structure is characterized by continuous, unitary, molded web means encircling the axis of rotation of the driving assembly and spaced from a clutch drive shaft. This web means defines a plurality of clutch shoe receiving pockets. Each such pocket faces outwardly of the axis of rotation of the clutch and has a pair of mutually facing, arcuate, clutch shoe supporting faces. Each of the clutch shoe supporting faces is convex. Pocket sidewall means, molded integrally with the web means, serve to prevent the clutch shoe means from moving parallel to the axis of rotation of the clutch and out of its associated pocket.

DESCRIPTION OF DRAWINGS

In describing the invention, reference will be made to a preferred embodiment shown in the appended drawings.

In the drawings:

FIGURE 1 is an elevational view of a centrifugal clutch fabricated in accordance with the present invention and illustrating relationships between the driving assembly and driven assembly when clutch shoes carried by the driving assembly are retracted;

FIGURE 2 provides a sectional view of the FIGURE 1 clutch as viewed along the section line 2—2 of FIGURE 1;

FIGURE 3 provides a further sectional view of the FIGURE 1 clutch as viewed along the section line 3—3 of FIGURE 2;

FIGURE 4a is a schematic illustration of geometrical relationships between a clutch shoe, clutch shoe engaging cam means carried by the driven assembly of the clutch, and a clutch face carried by the driven assembly of the clutch, with the clutch shoe being in its retracted position; and FIGURE 4b illustrates a modified showing of the FIGURE 4a arrangement with the clutch shoe in clutching engagement with the driven assembly.

DETAILED DESCRIPTION OF CLUTCH STRUCTURE

FIGURES 1 through 3 illustrate structural details of a centrifugal clutch 1 fabricated in accordance with the present invention.

The clutch 1 includes a driving assembly 2 mounted for unitary movement with a drive shaft 3. A driven assembly 4, comprising the output portion of clutch 1, may also be journaled on shaft 3 for free rotation. This free rotation may be facilitated by a shaft mounted bushing or bearing 5.

Driven assembly 4 provides an annular clutch drum 6. Clutch drum 6 may be essentially cylindrically configured and provide a first, cylindrical, clutch face 7 coaxially with the axis of rotation 8 of the drive shaft 3.

Rotary motion of driven assembly 4 may be transmitted to work means such as the drive sprocket chain of a chain saw by a sprocket wheel 9 formed as an integral or connected component of the driven assembly 4.

Driving assembly 2 comprises a one piece molded hub 10. Hub 10 is preferably molded of plastic material having a low coefficient of friction such as nylon or Delrin. Delrin is a well known acetal resin manufactured by Du Pont.

As shown in FIGURES 1 through 3 a metallic and generally annular core 11 may be embedded in a unitary manner in a central portion of hub 10.

Hub 10 may be mounted in end 3a of a drive shaft 3 so as to abuttingly engage a radially extending flange 12. Flange 12 may be rigidly secured with the shaft 3 by conventional fastening means such as welding or may be fabricated as an integral portion of the shaft 3. A conventional threaded fastening 13 may serve to secure hub 10 on shaft end 3a and prevent rotation of the hub 10 relative to the shaft 3 by pressing the hub core 11 tightly against the shaft shoulder or flange 12. If desired a conventional key 14 carried by core 11 may engage a slot 15 in shaft end 3a so as to more positively interconnect the hub 10 to the shaft 3 so as to prevent rotation between the components of the clutch 1.

Hub 10 is characterized by an essentially web-like, unitary, molded plastic, web portion 16 which is radially spaced from the drive shaft 3 and undulates about the drive shaft 3 so as to define a plurality of clutch shoe receiving pockets 17, 18, 19 and 20. Each such pocket, such as the pocket 17, is characterized by a pair of mutually facing, arcuate clutch shoe supporting faces. Thus pocket 17 includes a pair of mutually facing, cylindrical faces 21 and 22, each having an axis of curvature parallel to the axis of rotation 8 of the clutch 1. Faces 21 bear a generally mirror image relationship to each other and are convex, i.e., bulge outwardly away from the central portion of the clutch hub. Faces 21 and 22 bear a mirror image relationship to each other with respect to a median plane 23 which symmetrically intersects the hub 10 and is coplanar with the axis of rotation 8.

Web 16 is supported in a more or less cantilever fashion by radially extending base wall portion 24 of hub 10.

As illustrated in FIGURE 2, wall portion 24 provides wall means closing the right side of the clutch shoe receiving pockets of the clutch 1, when the assembly is viewed as shown in FIGURE 2. Thus wall means 24 provides a pocket closing end wall 25 at the right end of pocket 19 and a similar pocket closing end wall for each of the other clutch shoe receiving pockets 17, 18 and 20.

The left end of each clutch shoe receiving pocket is also closed by an integrally formed and generally radially extending wall like portion of the hub 1. Thus the left end of the pocket 19 as viewed in FIGURE 2, is closed by a radial wall portion 26 of hub 10.

A centrifugally responsive clutch shoe is supported in each of the pockets 17, 18, 19 and 20. A clutch shoe 27 is supported in pocket 13, a clutch shoe 28 is supported in pocket 18, a clutch shoe 29 is supported in pocket 19, and a clutch shoe 30 is supported in pocket 20.

Each of the clutch shoes is identical such that it is necessary to describe only one of these components of the clutch 1.

Representative clutch shoe 27 is fabricated from material such as sintered iron or conventional brake lining material. This clutch shoe includes a second clutch face means, i.e., radially outwardly directed face means 31. Face means 31 has a radius of curvature equal to the radius of curvature of the first clutch face 7 of driven assembly 4. Shoe 27 also includes a pair of generally inwardly facing, cylindrical segment faces 32 and 33. When clutch shoe 27 is in its retracted position such that face 31 is radially spaced from face 7 by a distance D, faces 32 and 33 conformingly or matingly engage pocket faces 21 and 22 respectively.

Each clutch shoe 27 may be provided with a radially outwardly facing, circumferentially extending, arcuate groove. Thus shoe 27 includes an outwardly facing arcuate groove 34, defined by a cylindrical segment, base wall 35 and radially extending side walls 36 and 37. As will thus be appreciated, each such clutch shoe groove divides the clutch face means of the shoe into a pair of cylindrical, axially spaced, and parallel clutch face portions. Thus clutch face means 31 is divided by groove 34 into parallel clutch face segments 31a and 31b.

An annular coil spring extends circumferentially about the hub 10 and passes through the peripheral groove of the clutch shoes, such as the grooves 34 of shoe 27. This coil spring 38 yieldably and resiliently biases the clutch shoes in unison against the clutch shoe supporting faces of the pockets defined by the web 16.

FIGURE 3 illustrates the manner in which the coil spring 38 serves to yieldably maintain the clutch shoes 27, 28, 29 and 30 in the hub pockets 17, 18, 19 and 20 respectively. In this retracted position, the clutch shoes are all disposed so that their radially outwardly facing, and generally cylindrically configured, clutch face portions are parallel to but spaced from the clutch face 7 of the driven assembly 4.

As shown in FIGURE 3 the surface conforming engagement between the pocket faces and the pocket engaging clutch shoe faces serves to positively support each clutch shoe in its retracted position so as to prevent clutch shoe rocking and maintain the parallel relationship between the clutch face means 31 of the retracted clutch shoe and the clutch face means 7 of the driven assembly. Thus the mating engagement between clutch shoe faces 32 and 33 and pocket faces 21 and 22 serves to symmetrically stabilize shoe 27 within pocket 17 so as to maintain the clutch face means 31 parallel to the drum face means 7. In this position, the shoe 27 is symmetrically disposed in relation to the median plane 23 and each of the clutch shoe corners 31c and 31d is spaced an equal radial distance from the surface 7 as well as an equal distance from the surface 7 as measured in a direction parallel to the plane 23.

As will be appreciated, the side walls of each pocket serve to prevent axial movement of the clutch shoes out of the clutch shoe pockets of the hub 10. Thus side walls 25 and 26 of pocket 19 serves to prevent axial movement of clutch shoe 29 out of pocket 19. As will also be appreciated while side walls 25 and 26 are disposed in essentially flush proximity to clutch shoe 29, they do not interfere with the centrifugally responsive, radially outward movement of the shoe 29. Each of the clutch shoe supporting faces of each of the clutch shoe supporting pockets, which is shaped primarily as a cylindrical segment, is uniquely oriented so as to be conformingly, i.e. matingly, engageable with an opposing face of a clutch shoe whether the clutch shoe is in its retracted position or engaged with the drum 6. As will be understood, when each clutch shoe is extended, i.e., engaged with the drum 6, the radially outwardly facing clutch face means of the shoe is conformingly or matingly engaged with the cylindrical surface 7.

The location of the axis of curvature of each clutch shoe supporting face which will yield this unique conforming engagement between the face and the clutch shoe, whether the clutch shoe is in its retracted position or clutch drum engaging position is critical. It is common to each of the clutch shoe supporting faces of the clutch 1 and thus need be described with references to only one representative clutch shoe supporting face.

Thus, representative clutch shoe supporting face 22, as shown in FIGURE 4a has a center of curvature 39. This center of curvature 39 lies on an axis of curvature extending parallel to the axis of rotation 8. The axis of curvature 39 is displaced from a median plane 40 of hub 10 in a direction away from the face 22. The plane 40 extends through the axis of rotation 8, which is common to the driving and driven assemblies. Plane 40 is also perpendicular to the aligned radii of curvature of the face means 31 and 7. As will be understood the radii of curvature of face means 31 and 7 are each aligned with the median plane of symmetry 23 of the shoe 27. The center of curvature 41 of the clutch face means 31 is displaced from the center of curvature 8 of the clutch face means 7 along the aligned radii, i.e., along the plane 23, by the distance D.

The displacement of the center of curvature 39 of the face 22, as measured perpendicular to and relates to the plane 40, is equal to one half of the distance D.

The lateral displacement of the axis of curvature 39 from the plane 23 and the magnitude of the radius of curvature of the surface 22 is empirically determined so as to provide optimum self-energizing and releasing characteristics for the clutch shoe 27 in relation to the drum 6. In other words, the curvature of the surface 22 should be such in relation to the coefficient of friction of materials of the web 16, clutch shoe 27, and drum 6 so as to enable the faces 7 and 22, when the clutch shoe 27 is centrifugally actuated to engage the drum 6, to wedgingly cooperate, and wedgingly hold the clutch shoe 27 in clutching engagement with the drum 6. In this connection, it will be appreciated that pocket face 22 functions as a cam to secure shoe 27 by cooperating with shoe face 33 which functions as a cam follower. However, the wedging cooperation must not be so intense as to produce a locking effect which would prevent a desired rapid retraction of the shoe 27 when the rotary speed of the driving assembly 2 falls beneath the critical operating speed necessary to effect centrifugally responsive, radial outward movement of the shoes of the clutch 1.

As will thus be appreciated although the displacement of the center 39 from the plane 40 is to equal one half of the distance D, the displacement of the center 39 laterally away from the plane 23, and the magnitude of the radius of curvature of the face 22 will vary depending upon the friction properties of the clutch components.

MODE OF OPERATION OF THE CLUTCH

So long as the drive shaft 8 rotates at a speed beneath a predetermined clutching speed, the clutch shoes of the driving assembly 2 will be held in their stabilized, retracted position by the coil spring 38. In this position, as shown in FIGURE 4a, all of the clutch faces, such as the face means 31 of the shoe 27, will be parallel to the drum face 7. In this retracted position, the clutch shoe supporting faces of each clutch shoe receiving pocket will matingly or conformingly engage surface portions of the clutch shoes so as to prevent clutch shoe rocking. Thus, in the retracted position of clutch shoe 27, the faces 21 and 22 conformingly engage the faces 32 and 33.

In this retracted position, each clutch shoe is symmetrically stabilized relative to the clutch drum 6 so that the corners of the clutch shoe are spaced an equal distance from the surface 7.

When clutch actuating speed of the driving shaft 8 is attained, centrifugal force acting on the clutch shoes is sufficient to overcome the restraining effect of the coil spring 38 and cause the clutch shoes to move radially outwardly into clutching or conforming engagement with the surface 7. Thus, when this clutching speed is attained, the clutch shoe 27 will be extended, i.e., displaced radially outwardly, so as to bring the clutch surface means 31 into conforming engagement with the surface means 7. Simultaneously the hub 10 will rotate in the direction of rotation of the shaft 3 toward the outwardly displaced clutch shoes so as to re-establish or maintain engagement between the hub and the clutch shoe. Thus, as shown in FIGURE 4b, on the assumption that the driving assembly 2 is rotating in a counterclockwise direction, the clutch hub face 22 will engage the shoe face 33 when the shoe 27 is in its extended position so as to bring the clutch shoe face means 31 into conforming or clutching engagement with the drum face means 7.

The ability of the faces 22 and 33 to be in surface conforming contact, whether the clutch shoe 27 is in its retracted or extended position, is a direct consequence of the critical location of the center of curvature 39. From the standpoint of geometric analysis, the critical displacement of the center of curvature 39 from the plane 40 may be explained in terms of a theoretical arcuate translation of the shoe 27 relative to the hub 10. The center of curvature 39 is displaced from the plane 40 so as to lie on a plane extending parallel to plane 40 and which is disposed midway between the center of curvature 8 of the surface 7 and the center of curvature 41 of the surface 31, with the shoe 27 retracted. The shoe 27 can rotate about the center 39, while maintaining surface contact with the surface 22, and bring the surfaces 31 and 7 into conforming engagement. As will be appreciated, this rotation of the shoe 27 relative to the surface 22 will bring the center of the curvature 41 into coaxial alignment with the center of curvature 8.

In other words the arc of movement of the shoe 27 must be coaxial with a circular arc passing through the displaced centers of curvatures 8 and 41 as shown in FIGURE 4a. This arc of curvature, of course, will have a center of curvature located on the perpendicular bisector of the line interconnecting the center 8 and 41.

When the operating speed of the shaft 3 drops below the clutch shoe actuating speed, the coil spring 38 will restore the clutch shoes to their stabilized, retracted positions where they are supported in symmetric relation relative to median planes of each of the clutch shoe receiving pockets.

So long as the clutch shoes are in their centrifugally actuated, extended positions, the hub 10 will cooperate with the drum 6 so as to wedgingly or cammingly secure the clutch shoes in clutched engagement with the driven assembly 4. This cooperation will provide an intensification of the clutching action resulting from the mere centrifugally responsive displacement of the clutch shoes into engagement with the surface 7.

SUMMARY OF ADVANTAGES AND SCOPE OF INVENTION

The manner in which the clutch shoe receiving pockets of the hub of the clutch stably and symmetrically support the clutch shoes in their retracted position is particularly advantageous. These pockets serve to prevent rocking of the clutch shoes which would tend to produce wear and erratic clutch action. In addition, this stable and symmetric supporting arrangement for the clutch shoes provides uniform corner clearance between the corners of the retracted clutch shoes and the clutch drum. This uniform spacing enables minimum clearance to be maintained between the shoes and the clutch drum. In being able to maintain such minimum clearance, the response time of the clutch is reduced so as to provide a more responsive clutch mechanism, with less speed change being required to induce the clutch shoes to move between their retracted and engaged conditions.

The surface conforming engagement between the hub pockets and the clutch shoes when the clutch shoes are in their extended or clutched position is also noteworthy. This surface conforming engagement between the clutch shoes and the hub provides optimum self-energizing characteristics and tends to reduce wear between the hub and the shoes.

It will be recognized that the combined advantages of uniform clutch shoe corner clearance and simultaneous mating engagement between the clutch shoes and drum and between the clutch shoes and hub will result only when the centers of curvature of the hub cams are each displaced as shown generally in FIGURE 4a. Obviously, for example, if the center of curvature 39 of the cam 22 were positioned so as to be disposed between the median plane 40 and the cam 22, this mode of conforming engagement between the shoe and hub and between the shoe and clutch drum would be geometrically impossible to obtain while yielding, at the same time, the symmetrical disposition of the clutch shoe face 31 when the clutch shoe 27 is in its retracted position. Absent this symmetric disposition of the clutch shoe, when it is retracted, uneven clearance between the corners of the clutch shoe and the clutch drum will result. Such uneven clearance will require the maximum corner clearance to govern the dimensions of the clutch so as to reduce the clutch responsiveness.

The ability of the shoes to translate through a continuous arc in moving from retracted to extended positions enables the clutch shoes, while moving radially outwardly from their retracted position to maintain smooth surface engaging contact with the hub so as to produce a smooth, positive, and effective clutching action. This also reduces wear of the mating faces.

The unitary character of the hub component 10 which supports the clutch shoes contributes to simplicity of clutch construction and minimizes the clutch cost.

The web-like character of the clutch supporting pockets reduces the weight of the driving assembly and thus reduces the inertia of the driving assembly and increases the responsiveness of the clutch mechanism in relation to changes in operating speed of the drive shaft.

The web-like character of the clutch shoe supporting pockets, as opposed to a solid hub structure, may also provide improved heat dissipating characteristics.

In describing the invention, reference has been made to a preferred embodiment as shown in the appended drawings. However, those skilled in the clutch art and familiar with the disclosure of this invention may well recognize additions, deletions, substitutions, or other modifications which would fall within the purview of the invention as defined in the appended claims.

I claim:
1. A centrifugal clutch comprising:
a driving assembly adapted to be connected to rotary drive means;
a driven assembly adapted to be connected to rotary load means, said driven assembly including arcuately extending, first clutch face means facing inwardly toward the axis of rotation of said driven assembly;
said driven assembly and said driving assembly having coaxially aligned axes of rotation;
said driving assembly including centrifugally responsive, clutch shoe means having generally outwardly facing and arcuately extending, second clutch face means, said second clutch face means having a radius of curvature substantially the same as the radius of curvature of said first clutch face means;
said driving assembly further including support means adapted to support said clutch shoe means in a retracted position with a radius of curvature of said second clutch face means aligned with a radius of curvature of said first clutch face means and with the axis of curvature of said second clutch face means being radially displaced from the axis of curvature of said first clutch face means along said aligned radii by a distance equal to the radial distance between said second clutch face means and said first clutch face means as measured along said aligned radii;
said support means including a generally arcuately extending cam means having an axis of curvature parallel to the axis of rotation of said driving assembly, said axis of curvature being perpendicularly displaced, in a direction away from said cam means, from a plane which extends along the axis of curvature of said first clutch face means and is perpendicular to said aligned radii;
said displacement of said axis of curvature of said cam means and said plane, when said clutch shoe means is in said retracted position, being equal to substantially half of the distance between said first and second clutch face means as measured along said aligned radii; and
said clutch shoe means including cam follower means adapted to matingly engage said cam means when said clutch shoe means is in said retracted position and in engagement with said first clutch face means.

2. A centrifugal clutch comprising:
a driving assembly adapted to be connected to rotary drive means;
a driven assembly adapted to be connected to rotary load means, said driven assembly including arcuately extending, first clutch face means facing radially inwardly toward the axis of rotation of said driven assembly;
said driven assembly and said driving assembly having coaxially aligned axes of rotation;
said driving assembly including centrifugally responsive, clutch shoe means having generally radially outwardly facing and arcuately extending, second clutch face means, said second clutch face means having a radius of curvature substantially the same as the radius of curvature of said first clutch face means;
said driving assembly further including hub means having circumferentially spaced support means adapted to support said clutch shoe means in a retracted position with a radius of curvature of said second clutch face means aligned with a radius of curvature of said first clutch face means and with the access of curvature of said second clutch face means being radially displaced from the axis of curvature of said first clutch face means along said aligned radii by a distance equal to the radial distance between said second clutch face means and said first face means as measured along said aligned radii;

said driving assembly further including resilient means tending to yieldably and resiliently bias said clutch shoe means toward said support means;

said support means including a generally arcuately extending, cam means having an axis of curvature parallel to the axis of rotation of said driving assembly, said axis of curvature being perpendicularly displaced in a direction away from said cam means, from a plane which extends along the axis of curvature of said first clutch face means and is perpendicular to said aligned radii;

said displacement of said axis of curvature of said cam means and said plane, when said clutch shoe means is in said retracted position, being equal to substantially half of the distance between said first and second clutch face means as measured along said aligned radii;

and said clutch shoe means including cam follower means adapted to engage said cam means when said clutch shoe means is in said retracted position and in engagement with said first clutch face means.

3. A centrifugal clutch comprising:

a driving assembly adapted to be connected to rotary drive means;

a driven assembly adapted to be connected to rotary load means, said driven assembly including arcuately extending, first clutch face means comprising a cylindrical segment facing radially inwardly toward the axis of rotation of said driven assembly;

said driven assembly and said driving assembly having coaxially aligned axes of rotation;

said driving assembly including centrifugally responsive, clutch shoe means having generally radially outwardly facing and arcuately extending second clutch face means, said second clutch face means comprising a cylindrical segment having a radius of curvature substantially the same as the radius of curvature of said first clutch face means;

said driving assembly further including hub means having support means adapted to support said clutch shoe means in a retracted position with a radius of curvature of said second clutch face means aligned with a radius of curvature of said first clutch face means and with the axis of curvature of said second clutch face means being radially displaced from the axis of curvature of said first clutch face means along said aligned radii by a distance equal to the radial distance between said second clutch face means and first clutch face means as measured along said aligned radii;

said driving assembly further including resilient means tending to yieldably and resiliently bias said clutch shoe means toward said support means;

said support means including a generally arcuately extending cam means having an axis of curvautre parallel to the axis of rotation of said driving assembly, said axis of curvature being perpendicularly displaced, in a direction away from said cam means, from a plane which extends along the axis of curvature of said first clutch face means and is perpendicular to said aligned radii;

said displacement of said axis of curvature of said cam means and said plane, when said clutch shoe means is in said retracted position, being equal to substantially half of the distance between said first and second clutch face means as measured along said aligned radii;

said clutch shoe means including cam follower means adapted to engage said cam means when said clutch shoe means is in said retracted position and in engagement with said first clutch face means;

said support means carried by said driving assembly including circumferentially spaced and mutually facing portions engageable with said clutch shoe means when said clutch shoe means is retracted, to prevent rocking movement thereof relative to said driving assembly; and at least one of said mutually facing portions providing said cam means, with said cam means being matingly engageable with a surface portion of said cam follower means when said clutch shoe means is centrifugally actuated to bring said second clutch face means into mating engagement with said first clutch face means.

4. A centrifugal clutch comprising:

a driving assembly mounted on a rotary drive shaft;

a driven assembly adapted to be connected to rotary load means, said driven assembly including arcuately extending, first clutch face means comprising a cylindrical segment facing radially inwardly toward the axis of rotation of said driven assembly;

said driven assembly and said driving assembly having coaxially aligned axes of rotation;

said driving assembly including a plurality of centrifugally responsive, clutch shoe means each having generally radially outwardly facing and arcuately extending, second clutch face means, with each of said second clutch face means comprising a cylindrical segment having a radius of curvature substantially the same as the radius of curvature of said first clutch face means;

continuous, unitary, molded web means carried by said driving assembly encircling the axis of rotation of said driving assembly and spaced from said drive shaft;

said web means defining a plurality of clutch shoe receiving pockets, each of said pockets facing outwardly of said axis of rotation and having a pair of mutually facing, arcuate, clutch shoe supporting faces, with each said clutch shoe supporting face having an axis of cylindrical curvatures;

each of said clutch shoe supporting faces being convex;

pocket side wall means molded integrally with said web means to prevent each of said clutch shoe means from moving parallel to said axis of rotation and out of its associated pocket;

said clutch shoe supporting faces of each pocket being adapted to support an associated clutch shoe means in a retracted position with a radius of curvature of the second clutch face means of said associated clutch shoe means being aligned with a radius of curvature of said first clutch face means and with the axis of curvature of said second clutch face means of said associated clutch shoe means being radially displaced from the axis of curvature of said first clutch face means along said aligned radii by a distance equal to the radial distance between the second clutch face means of said associated clutch shoe means and said first clutch face means as measured along said aligned radii;

said driving assembly further including resilient means tending to yieldably and resiliently bias each of said clutch shoe means toward a said pocket;

each said clutch shoe supporting face defining cam means having an axis of cylindrical curvature parallel to the axis of rotation of said driving assembly, with said axis of curvature of each such clutch shoe supporting face being perpendicularly displaced, in a direction away from said cam means, from a plane which extends along said axis of rotation and is perpendicular to the aligned radii of said first clutch face means and a second clutch face means of retracted clutch shoe means engaged with such supporting face;
each said displacement of said axis of curvature of said clutch shoe supporting face and a said plane, when said clutch shoe means are in said retracted position, being equal to substantially half of a said distance between said first clutch face means and the second clutch face means of a said retracted clutch shoe means engageable with said supporting face as measured along said aligned radii;
each said clutch shoe means including a pair of spaced cam follower surface means, each such surface means having an axis of cylindrical curvature, and both of said surface means being adapted to conformingly and simultaneously engage a said pair of clutch shoe supporting faces to prevent rocking of said clutch shoe means.

References Cited

UNITED STATES PATENTS

| | | |
|---|---|---|
| 2,718,294 | 9/1955 | Armstrong. |
| 2,852,117 | 9/1958 | Sproul. |
| 3,187,871 | 6/1965 | Rice. |

FOREIGN PATENTS

| | | |
|---|---|---|
| 245,323 | 1/1926 | Great Britain. |

BENJAMIN W. WYCHE III, *Primary Examiner.*

U.S. Cl. X.R.

192—75